US008661278B2

(12) United States Patent
Lefebvre et al.

(10) Patent No.: US 8,661,278 B2
(45) Date of Patent: Feb. 25, 2014

(54) COMPUTER SYSTEM POWERED-OFF STATE AUXILIARY POWER RAIL CONTROL

(75) Inventors: Joel P. Lefebvre, Windsor, CO (US); John R. Spencer, Fort Collins, CO (US); Shane Ward, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 141 days.

(21) Appl. No.: 13/142,699

(22) PCT Filed: Jan. 30, 2009

(86) PCT No.: PCT/US2009/032755
§ 371 (c)(1),
(2), (4) Date: Jun. 29, 2011

(87) PCT Pub. No.: WO2010/087855
PCT Pub. Date: Aug. 5, 2010

(65) Prior Publication Data
US 2011/0271131 A1 Nov. 3, 2011

(51) Int. Cl.
*G06F 1/00* (2006.01)
(52) U.S. Cl.
USPC .......................................... 713/323; 713/300
(58) Field of Classification Search
USPC ........................................................ 713/300
See application file for complete search history.

(56) References Cited

U.S. PATENT DOCUMENTS 5,410,711 A * 4/1995 Stewart ........................ 713/322
6,523,128 B1 * 2/2003 Stapleton et al. ............ 713/330
6,775,784 B1 8/2004 Park
7,188,263 B1 * 3/2007 Rubinstein et al. .......... 713/300
2002/0062455 A1 * 5/2002 Lee ............................... 713/323
2003/0110405 A1 * 6/2003 Ryu .............................. 713/320
2003/0218386 A1 * 11/2003 Dalke et al. .................... 307/80
2004/0215983 A1 * 10/2004 Kwahk et al. ................ 713/300
2005/0044427 A1 * 2/2005 Dunstan et al. .............. 713/300
2008/0082840 A1 * 4/2008 Kendall et al. ............... 713/300
2010/0001589 A1 * 1/2010 Shi ............................... 307/115
2010/0100753 A1 * 4/2010 Zou .............................. 713/323
2011/0047393 A1 * 2/2011 Tracy et al. .................. 713/300

FOREIGN PATENT DOCUMENTS

JP 2005-033485 A 2/2005
KR 2004-0001727 A 1/2004

OTHER PUBLICATIONS

Lefebvre, Joel Pierre, et al., "Notification of Transmittal of the International Search Report and the Written Opinion of the International Searching Authority, or the Declaration," International Application No. PCT/US2009/032755 filed Jan. 30, 2009, Date of Mailing: Oct. 16, 2009, 12 pages.

* cited by examiner

*Primary Examiner* — Chun Cao
*Assistant Examiner* — Robert Cassity

(57) ABSTRACT

Computer system powered-off state auxiliary power rail control. At least some of the illustrative embodiments are systems configured to have: a first powered-off state in which the main output power signal is deactivated within the power supply and the auxiliary power output signal is active and coupled to an auxiliary power rail of the printed circuit board; and a second powered-off state in which the main power output signal is deactivated and the auxiliary power output signal is active and decoupled from the auxiliary power rail of the printed circuit board.

14 Claims, 5 Drawing Sheets

COMPUTER SYSTEM POWERED-OFF STATE AUXILIARY POWER RAIL CONTROL

BACKGROUND

Computer systems operating under the Advanced Configuration and Power Interface (ACPI) specification may implement several different system states. For example, under the ACPI specification a computer system may have: an "S0" state in which the computer system is fully operational; an "S3" state in which power to the processor is turned off yet the random access memory (RAM) remains powered and the contents maintained (i.e., a standby or sleep state); and "S5" state in which most devices are turned off, yet one or more components remain powered so that the computer system can wake based on activity of the keyboard, modem, local area network (LAN) message, or a universal serial bus (USB) device (i.e., a soft-off state). In an attempt to reduce demand on power generation and distribution facilities, some political jurisdictions dictate an amount of power that a device may use in particular off states. For example, the European Union (EU) requires that all computer systems sold in the EU after 2010 draw one watt or less in the off state.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
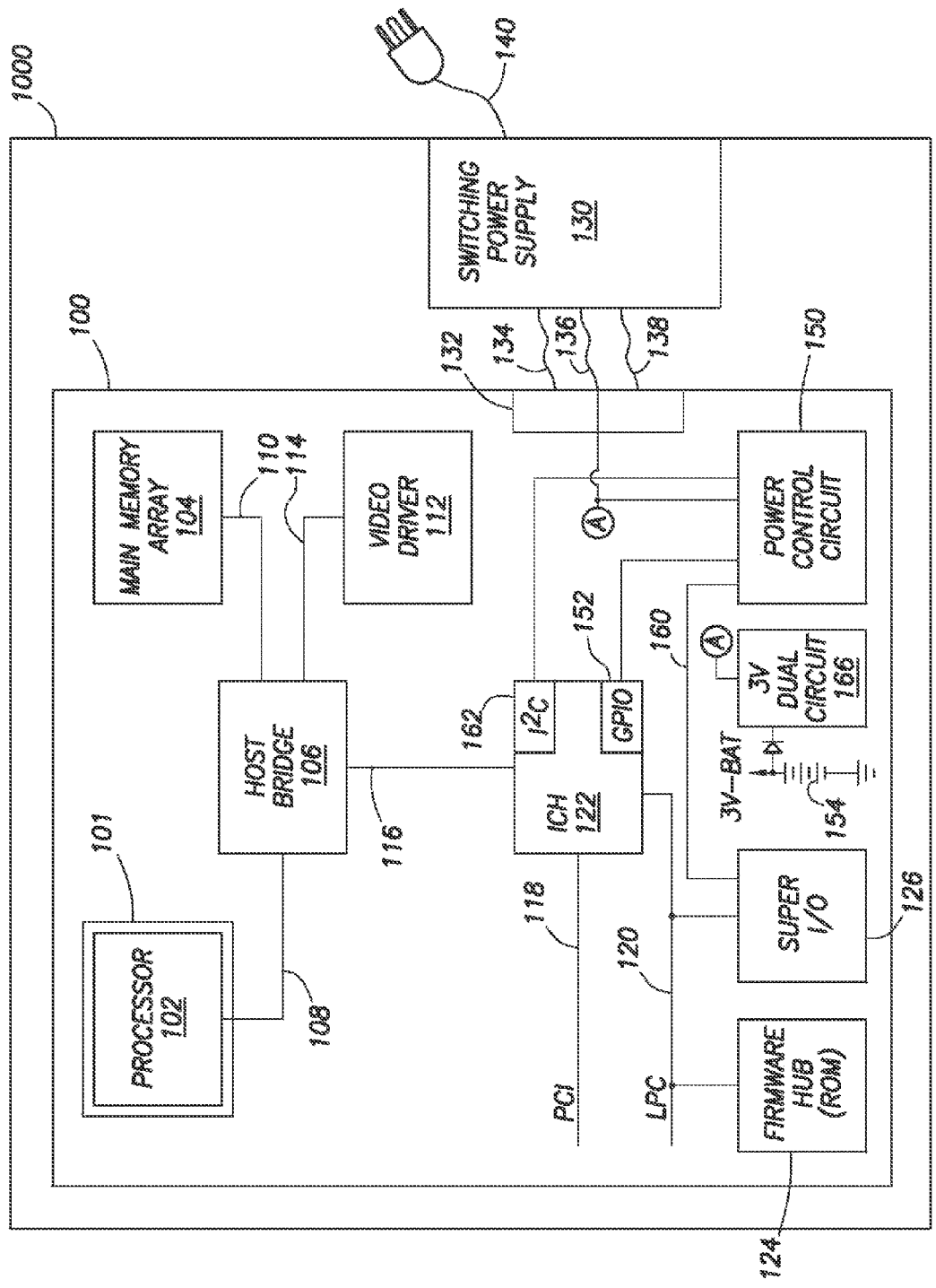
FIG. 1 shows a system in accordance with at least some embodiments.

FIG. 1 illustrates a computer system 1000 constructed in accordance with at least some embodiments. Computer system 1000 comprises a printed circuit board or motherboard 100 upon which various electrical components are coupled. In particular, the motherboard 100 comprises a processor socket 101 within which a processor 102 couples. The processor 102 couples to a main memory array 104, and various other peripheral computer system components, through integrated host bridge 106. The processor 102 couples to the host bridge 106 by way of a host bus 108, or the host bridge 106 may be integrated into the processor 102. Thus, the computer system 1000 may implement other bus configurations or bus-bridges, in addition to, or in place of, those shown in FIG. 1.

Main memory array 104 couples to the host bridge 106 through a memory bus 110. The host bridge 106 comprises a memory control unit that controls transactions to the main memory 104 by asserting control signals for memory accesses. The main memory array 104 functions as the working memory for the processor 102 and comprises a memory device or array of memory devices in which programs, instructions and data are stored. The main memory array 104 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM).

In some embodiments the computer system 1000 comprises a graphics controller or video driver 112 that couples to the host bridge 106 by way of an Advance Graphics Port (AGP) bus 114, or other suitable type of bus. Alternatively, the video driver 112 may couple to the primary expansion bus 116 or one of the secondary expansion buses (e.g., peripheral components interconnect (PCI) bus 118). The video driver 112 may further couple to a display device which may comprise any suitable electronic display device upon which any image or text can be represented. In some embodiments, the video driver 112 is integrated with the motherboard 100, and in other embodiments the video driver 112 is an add-in card that is physically and electrically coupled to the motherboard 100.

Still referring to FIG. 1, the computer system 1000 also comprises a second bridge 122 that bridges the primary expansion bus 116 to various secondary expansion buses, such as the PCI bus 118 and LPC bus 120. In accordance with some embodiments, the bridge 122 comprises an Input/Output Controller Hub (ICH) manufactured by Intel Corporation. In the embodiments shown in FIG. 1, the primary expansion bus 116 comprises a Hub-link bus, which is a proprietary bus of the Intel Corporation. However, computer system 1000 is not limited to a chipset manufactured by Intel, and thus other suitable chipsets, and therefore other suitable buses between the bridge devices, may be equivalently used.

A firmware hub 124 couples to the ICH 122 by way of the LPC bus 120. The firmware hub 124 comprises read-only memory (ROM) which contains software programs executable by the processor 102. The software programs comprise not only programs to implement basic input/output system (BIOS) commands, but also instructions executed during and just after power-on self tests (POST) procedures. The POST procedures perform various functions within the computer system before control of the computer system is turned over to the operating system.

A super input/output (I/O) controller 126 couples to the ICH 122 and controls many computer system functions, for example interfacing with various input and output devices such as a keyboard and a pointing device (e.g., mouse), various serial ports and floppy drives. The super I/O controller 126 is often referred to "super" because of the many I/O functions it performs.

Computer system 1000 further comprises a power supply 130, such as a switching power supply, that electrically couples to the motherboard 100 by way of a connector 132 (and corresponding connector on the cable which is not shown so as not to unduly complicate the figure). The power supply 130 produces main power output signal 134 and an auxiliary power output signal 136. In accordance with at least some embodiments, the main power output signal may comprise a plurality of direct current (DC) voltages, such as +12 Volt (V), −12 V, +5 V, −5V and +3.3V. In accordance with the various embodiments, the one or more voltages associated with the main power output signal 134 may be selectively turned on and off within the power supply 130, such as based on signals communicated over signal line 138 from the motherboard 100 to the power supply 130. In order for the motherboard 100 to have power to command the main power output signal on and off, the auxiliary power output signal 136 from the power supply 130 is active at all times when the power cord 140 is coupled to a source of alternating current (AC) power, such as a 120 V AC wall socket. The auxiliary power output signal 136 is in some cases a +5 V DC signal, but other voltages may be equivalently used.

The computer system 1000 of FIG. 1 may implement a power management protocol, such as the power management protocol defined by the Advanced Configuration and Power Interface (ACPI) specification. Because the various embodiments were developed in the context of the ACPI specification, this document describes the various embodiments with reference to the developmental context. However, computer systems need not be ACPI specification compliant to implement lower power sleep, hibernation and/or soft-off states, and thus the developmental context should not be construed as a limitation as to the applicability of the various embodiments. The illustrative ACPI specification defines several operational states for computer system 1000. For example, the "G0 working" (also known as "S0") state is a powered-on working state of the computer system 1000 in which the computer system components are powered and operational. The illustrative ACPI specification also defines a "G1 Sleeping" state, which G1 Sleeping state is divided into four sub-states, S1-S4, with each sub-state utilizing less power but also taking more time to wake.

In addition to the sleeping states that may be implemented under the ACPI specification, and in accordance with the various embodiments, the computer system 1000 is configured to have a plurality of powered-off states which may be selectively implemented. In a first powered-off state the main power output signal 134 is deactivated within the power supply and the auxiliary power output signal 136 is active and coupled to an auxiliary power rail of the motherboard 100. The first powered-off state is similar to the ACPI specification's G2 state (which may also be known as "S5" or "soft-off" state). Having the auxiliary power output signal 136 active and coupled to the auxiliary power rail enables various wake functions, such as wake on LAN activity. However, in order to implement the wake functionalities such as wake on LAN activity, the computer system 1000 may draw more than one watt of power in the first powered-off state, and thus may not be in compliance with mandates of various political jurisdictions.

In a second powered-off state the main power output signal 134 is deactivated within the power supply 130 and the auxiliary power output signal 136 is active, yet the auxiliary power output signal is decoupled from an auxiliary power rail of the motherboard 100. Stated otherwise, while the auxiliary power output signal 136 is electrically coupled to the motherboard 100, the power output signal 136 is electrically isolated from the auxiliary power rail across which the auxiliary power is distributed on the motherboard 100. The devices to implement the functionality that may be used to wake the computer system in the first powered-off state (e.g., LAN activity) are powered from the auxiliary power rail. Thus, in this second powered-off state the computer system 1000 may be turned on only by operation of the front panel power switch (or equivalent motherboard switch). While functionality such as wake on keyboard, mouse, USB device or LAN activity is not present in the second powered-off state, the computer system 1000 power draw is less than the illustrative ACPI sleep states S1-S4, and less than the illustrative S5 soft-off state. Thus, the second powered-off state is configured to bring the computer system 1000 in compliance with off-state power mandates, such as the one watt or less under the EU rules.

Implementing selection of a particular powered-off state, and handling various other situations having to do with power control in the computer system 1000, is handled at least in part by the power control circuit 150 of FIG. 1. Power control circuit 150 may take many forms, and the discussion turns first to an implementation in discrete logic.

Figure 2:
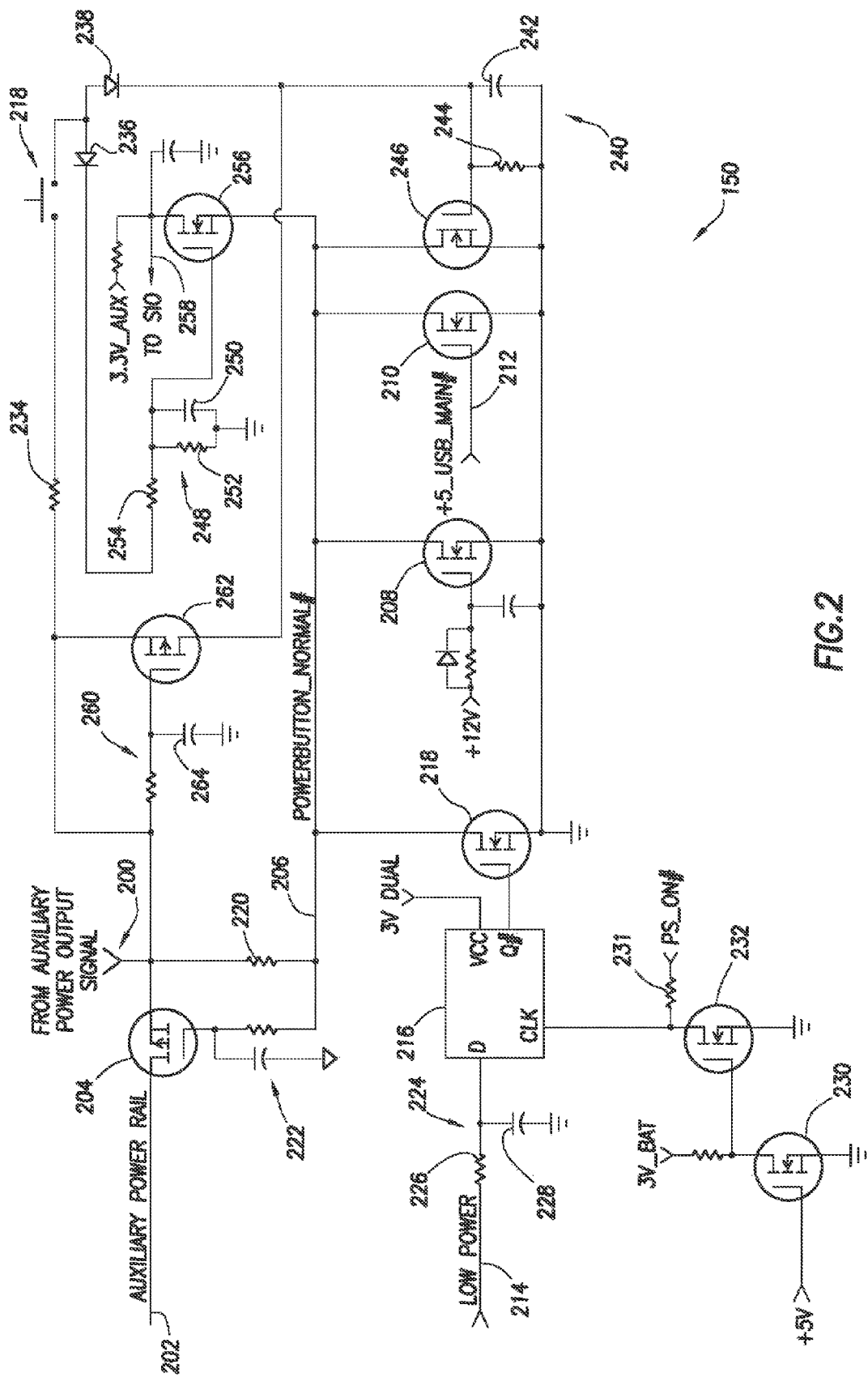
FIG. 2 shows a power control circuit in accordance with at least some embodiments.

FIG. 2 shows power control circuit 150 in accordance with at least some embodiments. The discrete components are implemented as a series of field effect transistors (FETs), signal asserted states (e.g., asserted high, asserted low (indicated by #)), and a D-latch; however, other transistor types, asserted states, and latch types may be equivalently used. The auxiliary power output signal 136 couples to the power control circuit 150 at location 200. In certain operational states of the computer system 1000 the auxiliary power output signal 136 couples to an auxiliary power rail 202 by way of P-channel FET 204 (such as a part number FDD6685_NL available from Fairchild Semiconductor of Irving, Tex.). In order for FET 204 to conduct, its gate is held at a low voltage by one of several circuits coupled to the signal line 206 (named PowerButton_Normal# in FIG. 2). The several conditions in which the signal line 206 is asserted (in the illustrative case of FIG. 2, asserted low) are addressed in turn.

Consider first a situation where the computer system 1000 is in a fully operational state, such as the S0 state under the illustrative ACPI specification, and that the computer system transitions to the S3 (standby or sleep) state under the ACPI specification. The S3 state is characterized by the RAM of the main memory array 104 remaining powered and thus maintaining its contents, and the computer system's ability to wake based on keyboard, mouse, USB or LAN activity. Powering of the RAM in the S3 state, and the various devices with which to wake the computer system, is by devices coupled to the auxiliary power rail 202. In the S0 state, the signal line 206 is held low by N-channel FET 208 (such as a 2N7002_NL from Fairchild), and thus the auxiliary power rail 202 is powered. In particular, in the S0 state the main power output signal 134 is active, and an illustrative +12V of the main power output signal 134 coupled to the gate of the FET 208 is active. As part of the transition to the S3 state, the +5V_USB_Main# signal on signal line 212 is de-asserted (here, the signal goes high), and thus the N-Channel FET 210 (such as a 2N7002_NL) conducts, maintaining the signal line 206 in a low condition. Soon after de-assertion of the +5V_USB_Main# on signal line 212, the computer system 1000 commands the power supply 130 to deactivate the main power output signal 136 (i.e., de-assert a signal named PS_ON#). Thus, FET 208 stops conducting upon loss of the +12V signal; however, the signal line 206 remains low by operation of FET 210, and the auxiliary power rail 202 remains powered in the illustrative S3 state.

Now consider the transition back to the S0 state from the S3 state. The computer system 1000 commands the power supply 130 to activate the main power output signal 134 (i.e., asserts PS_ON#). When the +12V of the main power output signal 134 is active, the +12V is again coupled to the gate of FET 208, which FET 208 maintains the signal line 206 in a low state. The computer system 1000 is further configured to de-assert the +5V_USB_MAIN# signal on signal line 212 approximately 100 milli-seconds after asserting PS_ON#, and thus in the transition from S3 to S0 the signal line 206 is held low by FET 210 until the main power output signal 134 is active, and thus the auxiliary power rail 202 remains powered through the transition.

Now consider a situation where the computer system transitions from an S0 fully operational state to a S5 soft-off state in accordance with the illustrative ACPI specification (i.e., an off-state where the computer system 1000 draws more than one watt of power). In particular, in the S0 state the main power output signal 134 is active, the +12V coupled to the gate of the FET 208 is active, and FET 208 holds signal line 206 low. In accordance with the various embodiments, prior to transitioning to an off-state, the computer system 1000, and in particular the BIOS programs, are configured to selectively assert or de-assert the LOW_POWER signal on signal line 214. In the illustrative case of a S0 to S5 transition where the low power off-state mode is not entered, the signal line 214 is de-asserted (here, the signal goes low) by way of a general purpose input/output (GPIO) port 152 (FIG. 1) of the ICH 122. The state of the signal on signal line 214 is latched by latch circuit 216 (such as a SN74AUP1G80DCKR available from Texas Instruments of Dallas, Tex.), which latch circuit 216 is an edge-trigger latch powered by the 3V dual circuit 166 (FIG. 1). The 3V dual circuit 166 couples both to the 3V battery 154 and to the auxiliary power signal 136. The 3V dual circuit is configured to supply power to the latch at all times. When the auxiliary power signal 136 is active, the 3V dual circuit regulates the voltage and supplies the voltage (and power) to the latch 216. When the auxiliary power signal 136 is not present, the 3V dual circuit 166 supplies power to the latch from the battery 154. In some embodiments, the 3V dual circuit may also supply the real-time clock.

The BIOS of the computer system 1000 is configured to drive the signal line 214 by way of the GPIO 152 with the appropriate state, and approximately 500 milli-seconds later de-assert the PS_ON# signal, which PS_ON# signal is also coupled to the clock input of the latch 216. Thus, the state of the signal line 214 is latched when the computer system 1000 commands the power supply 130 to deactivate the main power output signal 134. The inverted output Q# of the latch circuit 216 is coupled to the gate of an N-Channel FET 218 (such as a 2N7002_NL). In the illustrative S0 to S5 transition, the Q# signal coupled to the gate of FET 218 is high, and thus FET 218 maintains the signal line 206 in a low condition and the auxiliary power rail 202 remains powered. Although this paragraph describes an illustrative S0 to S5 transition, the power control circuit, in combination with the BIOS program, enables a similar S0 to S4 (i.e., hibernate) transition.

Now consider a situation where the computer system transitions from an S0 fully operational state to the second powered-off state discussed above, in which second powered-off state the computer system 1000 draws less than one watt of power. In this second powered-off state, in addition to the main power output signal 134 being deactivated within the power supply 130, the auxiliary power rail 202 is decoupled from the auxiliary power signal 136. Thus, in this second powered-off state the computer system 1000 does not wake based on keyboard, mouse, USB or LAN activity; rather, activation of a front panel power switch 218 (or a parallel switch physically coupled to the motherboard 100) triggers transition from the second powered-off state to the fully operational state. In particular, in the S0 state the main power output signal 134 is active, and the +12V coupled to the gate of the FET 208 is active. In accordance with the various embodiments, prior to transitioning to the second powered-off state, the computer system 1000, and in particular the BIOS programs, are configured to assert (here, the signal goes high) the LOW_POWER signal on signal line 214 by way of the GPIO port 152 (FIG. 1) of the ICH 122. The state of the signal on signal line 214 is latched by latch circuit 216. In particular, the BIOS of the computer system 1000 is configured to drive the signal line 214 with the appropriate state by way of GPIO 152, and approximately 500 milli-seconds later de-assert the PS_ON# signal coupled to the clock input of the latch circuit. Thus, the state of the signal line 214 is latched when the computer system 1000 commands the power supply 130 to deactivate the main power output signal 134. The inverted output Q# of the latch circuit 216 coupled to the gate of an N-Channel FET 218 is low, and thus FET 218 does not maintain the signal line 206 in a low condition.

Since the +12V associated with FET 208 turns off when the main power output signal 134 is deactivated, the +5V_USB_MAIN on signal line 212 is not asserted in this illustrative transition, and none of the other FETs (which have yet to be discussed) pull signal line 206 low. Thus, the signal line 206 is pulled high by the auxiliary power signal 136 through resistor 220 and RC delay circuit 222, which RC delay circuit provides current in-rush protection. When the gate of FET 204 is high, the auxiliary power rail 202 is decoupled from the auxiliary power output signal 136. In the illustrative second powered-off state configuration, the computer system 1000 draws less than one watt through the power cord 140, whether the power cord couples to 120 V AC, or 230 V AC.

As mentioned above, the LOW_POWER signal on signal line 214 is, in accordance with some embodiments, driven by GPIO port 152 on the ICH 122. However, after the main power output signal 134 is deactivated, the state of the GPIO port 152 is unstable. Moreover, after the main power output signal 134 is deactivated, the PS_ON# signal, in this case is coupled by resistor to signal 136, is pulled high to command the power supply 130 to deactivate the main power output signal 134 until which time the power button is pressed. In order to ensure correct latching of the state on the signal line 214 to enable the second powered-off state, some additional circuitry is utilized. In particular, the signal line 214 couples to the D input of the latch circuit 216 by way of RC circuit 224. For example, resistor 226 may be 100 kilo-Ohms, and capacitor 228 may be 15 micro-Farads. Thus, even after the GPIO port 152 becomes unstable, the voltage initially driven remains coupled to the input of the latch circuit 216 by way of the RC circuit 224. Further with respect to the CLK input of the latch circuit 216, a latching pulse is created by the combination of the N-Channel FET 230 (such as a 2N7002_NL), and N-Channel FET 232 (such as a 2N7002_NL).

In the fully powered state an illustrative +5V signal (from the main power output signal 134) is high, which enables FET 230 to conduct drain-to-source. Conduction of FET 230 drain-to-source holds the gate of FET 232 low, which isolates the drain and source of FET 232. Thus, the clock input of the latch 216 initially follows the PS_ON# signal (through resistor 231, such as a 100 kilo-Ohm). When PS_ON# is de-asserted (here, the signal goes high), a leading edge is provided to the clock input. A certain amount of time later, the +5V signal goes low (because the main power output signal 134 is deactivated within the power supply 130). Thus, the drain and source of FET 230 are isolated, which allows current from the battery 154 to drive the gate of FET 232 high. Conduction drain-to-source of FET 232 grounds the clock input signal initially driven high by de-assertion of PS_ON#, created the trailing edge of the clock pulse.

Figure 3:
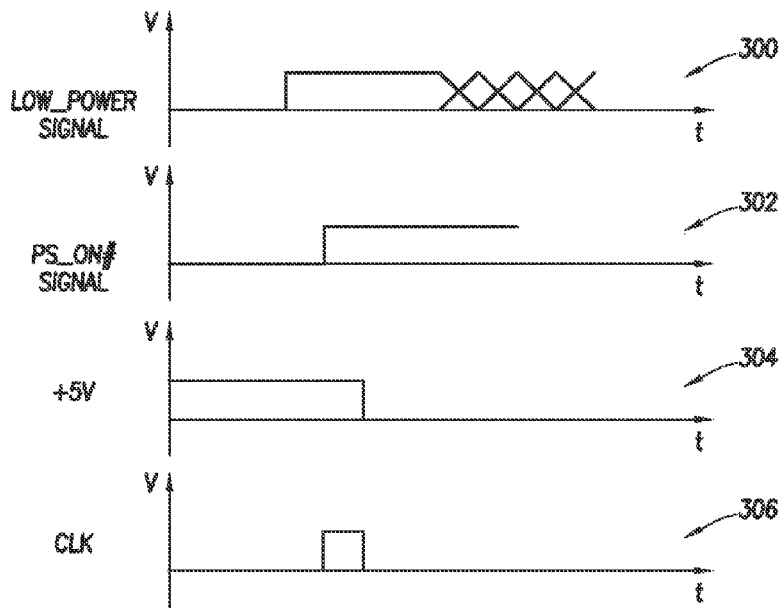
FIG. 3 shows a timing diagram in accordance with at least some embodiments.

FIG. 3 illustrates a timing diagram of the various signals in the illustrative situation of a transitioning from S0 to the second powered-off state in relation to the LOW_POWER signal on signal line 214, the PS_ON# signal and the CLK input signal created by the circuitry. In particular, FIG. 3 illustrates four plots as function of corresponding time. Plot 300 illustrates assertion of the LOW_POWER signal on signal line 214. Plot 302 illustrates the relationship between the assertion of the LOW_POWER signal and the de-assertion of the PS_ON# signal. As discussed above, in accordance with at least some embodiments, the BIOS asserts the LOW_POWER signal approximately 500 milli-seconds before commanding the deactivation of the main power output signals from the power supply (by de-asserting the PS_ON# signal). A certain amount of time after the PS_ON# is de-asserted, power stored on capacitors in the power supply 130 and/or on the motherboard 100 dissipates, and the +5V signal of the main power output signal goes low, as illustrated by plot 304. The combination of FETs 230 and 232 thus create a clocking pulse on the clock input of the latch, the clocking pulse illustrated by plot 306.

Now consider the transition from the second powered-off state to a fully operational state. As indicated above, in the second powered-off state the features such as wake on keyboard, mouse, USB device or LAN are not available. Rather, transitioning the computer system 1000 from the second powered-off state involves actuation of the front panel power switch 218 (or the motherboard 100 mounted equivalent). As illustrated by FIG. 2, in at least some embodiments the power switch 218 couples to the auxiliary power output signal 136. Optional resistor 234 (such as a 100 Ohm) may be present between the auxiliary power output signal 136 and the power switch 218 for short circuit protection. When the switch 218 is actuated, current flows along two paths, one through diode 236 and one through diode 238. The path through diode 238 is discussed first.

Upon actuation of power switch 218, current flows through diode 238 and charges the capacitor of an RC circuit 240. For example, capacitor 242 may be 22 micro-Farads, paralleled by resistor 244 that may be 453 kilo-Ohms. Thus, pressing of the power switch 218 drives the gate of N-Channel FET 246 (such as a 2N7002_NL) high, and the RC circuit 240 holds the gate high for a period of time after the power switch 218 is released. With the illustrative resistor and capacitor values, the RC circuit may hold the gate of FET 246 high for six to ten seconds. Other times may be equivalently used. When the gate of FET 246 is held high, FET 246 conducts drain-to-source, thus pulling signal line 206 low which powers the auxiliary power rail 202 through FET 204. Thus, FET 246 triggers powering of the auxiliary power rail 202, and maintains the powering of the auxiliary power rail while other devices and systems become active.

Now consider the path of the current flow through diode 236. Upon actuation of power switch 218, current flows through diode 236 and charges the capacitor of an RC circuit 248. For example, capacitor 250 may be 4.7 micro-Farads, paralleled by resistor 252 that may be 210 kilo-Ohms, and both capacitor 250 and resistor 252 are in series with resistor 254 which may be 1 kilo-Ohm. Thus, pressing of the power switch 218 drives the gate of N-Channel FET 256 (such as a 2N7002_NL) high, and the RC circuit 248 holds the gate high for a period of time after the power switch 218 is released. With the illustrative resistor and capacitor values, the RC circuit may hold the gate of FET 256 high for approximately 1.6 seconds. Other times may be equivalently used. When the gate of FET 256 is held high, FET 256 conducts drain-to-source, thus pulling signal line 258 coupled to the Super I/O 126 (FIG. 1) low. The connection between the power control circuit 150 and the Super I/O is shown on FIG. 1 as signal line 160. The Super I/O 126 sees assertion (here, the signal going low) of signal line 258 as an indication to command activation of the main power output signal 134 (by assertion of the PS_ON# signal previously discussed). RC circuit 248 and FET 256 thus ensure assertion of the signal line 258 for an amount of time sufficient for the Super I/O 126 wake (based on powering of the auxiliary power rail 202) and recognize the command to power the computer system 1000. Once the power supply 130 has activated the main power output signal 134, the +12V signal driving the gate of FET 208 goes high, thus maintaining the signal line 206 low as the RC circuits 240 and 248 lose voltage.

The specification now turns to power loss situations. Power could be lost based on the outages of the electrical power grid, or by disconnecting power cord 140 from the wall socket. Consider first the situation where the BIOS has been previously set to reboot the computer system 1000 to the illustrative S0 state after power loss. Still referring to FIG. 2, the power control circuit 150 further comprises RC circuit 260 and P-Channel FET 262 (such as a FDN352AP of Fairchild). The RC circuit 260 charges based on the auxiliary power output signal 136, and discharges (back through the signal 136) when power is lost. Capacitor 264 may be 4.7 micro-Farads, and resistor 266 may be 210 kilo-Ohms. When power is lost and then restored, the restored auxiliary power output signal 136 initially drives the gate of FET 204 high, which results in the auxiliary power rail 202 being without power. However, the power supply output signal 136 takes a certain amount of time to charge the RC circuit 260, and until the RC circuit is charged FET 262 conducts. During the charge time of RC circuit 260 current flows through FET 262 and charges the RC circuit 240 associated with FET 246. FET 246 conducts and thus pulls the signal line 206 low, which in turn causes FET 204 to conduct and power the auxiliary power rail 202. The Super I/O 126, powered from the auxiliary power rail 202 and configured by the BIOS to immediately boot the computer when power is restored, asserts PS_ON# which powers the +12V to the gate of FET 208, holding the signal line 206 low even after the RC network 260 charges turning of FET 262 and RC network 240 discharges turning off FET 246.

Now consider the power loss and restore situation where the BIOS has been previously configured to not reboot the computer system 1000 after lost power has been restored. In this illustrative situation, a previously configured BIOS selection of which powered-off state to implement becomes important. As before, the newly restored power supply output signal 136 takes a certain amount of time to charge the RC circuit 260, and until the RC circuit 260 is charged FET 262 conducts. During the charge time of RC circuit 260 current flows through FET 262 and charges the RC circuit 240 associated with FET 246. FET 246 conducts and pulls the signal line 206 low, which in turn causes FET 204 to power the auxiliary power rail 202. The Super I/O 126, powered from the auxiliary power rail 202, may realize power has been lost and restored, but is configured by the BIOS to not boot in the power lost and restored situation, and thus the Super I/O 126 refrains from asserting PS_ON#. Eventually, the RC circuit 240 will discharge (e.g., six to ten seconds) causing FET 246 to stop conducting, and unless another circuit is activated before FET 246 stops conducting, the signal line 206 is pulled high through resistor 220.

If the LOW_POWER signal on signal line 214 was previously asserted by the BIOS through the GPIO 152 (here, driving the signal high), then the Q# signal is low, and thus FET 218 will not drive signal line 206 low. In this situation, when RC circuit 240 discharges and FET 246 stops conducting, the gate of FET 204 is driven high and auxiliary power rail 202 is decoupled from the auxiliary power output signal 136. The computer system thus enters the second powered-off state as previously discussed. Stated otherwise, if the computer system 1000 was in the second powered-off state when power was lost and restored, then the system will again enter the second powered-off state (assuming the BIOS is not set to reboot on power restore).

On the other hand, if the LOW_POWER signal on 214 was previously de-asserted by the BIOS through the GPIO 152 (here, driving the signal low), then the Q# signal is high, and thus FET 218 conducts and maintains the signal line 206 in the low state as initially caused by FET 246. In this situation, the auxiliary power rail 202 remains coupled to the auxiliary power output signal 136, and the computer system enters the first powered-off state (e.g., S5) as previously discussed. Stated otherwise, if the computer system 1000 was in the first powered-off state (e.g., S5) when power was lost and restored, then the system will again enter the first powered-off state (assuming the BIOS is not set to reboot on power restore).

As mentioned above, the latch circuit 216 retains the state of the LOW_POWER signal through the second powered-off state (and power loss) based on a small trickle current from the 3V dual circuit 166. The 3V dual circuit 166 takes input primarily from the auxiliary power signal 136 (even in the illustrative second powered-off state), and in the absence of the auxiliary power signal 136 from both the battery 154. The power draw by the latch 216 and other circuit (I.a, the real time clock) is relatively low, e.g., 15-30 milli-Watts or less, and thus the computer system 1000 may still draw one watt or less in the second powered-off state.

Figure 4:
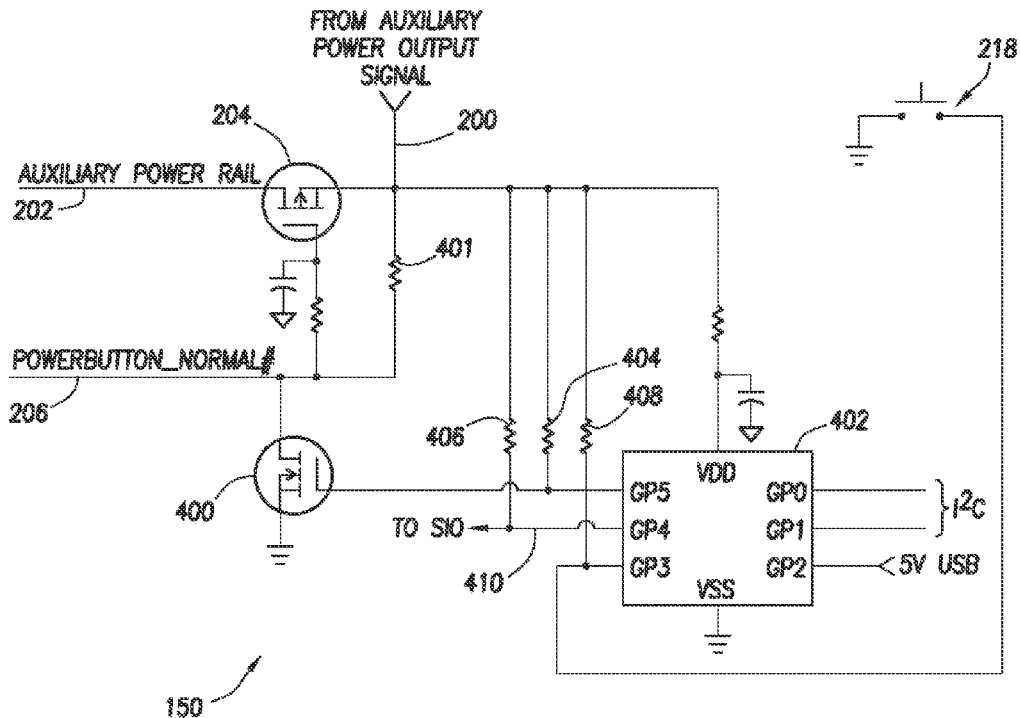
FIG. 4 shows a power control circuit in accordance with at least some embodiments.

In the embodiments discussed to this point the power control circuit 150 is implemented in discrete logic; however, a similar system may be utilized where the functionality of the power control circuit 150 is implemented at least in part by a small, low power processor, or as part of an application specific integrated circuit (ASIC). In particular, FIG. 4 illustrates embodiments where the functionality of the power control circuit 150 is implemented by a processor 402. The auxiliary power output signal 136 couples to the power control circuit 150 (and thus the motherboard 100) at location 200. In certain operational states of the computer system 1000 the auxiliary power output signal 136 couples to an auxiliary power rail 202 by way of P-channel FET 204. In order for FET 204 to conduct, its gate is held at a low voltage by signal line 206 (again named PowerButton_Normal#). In the embodiments of FIG. 4, in the various states where the signal line 206 is held low, FET 400 (such as a 2N7002_NL) conducts to hold the signal line low. In states where signal line 206 is pulled to a high voltage, thus decoupling the auxiliary power rail 202 from the auxiliary power supply output signal 136, the FET 400 isolates the signal line 206 from ground and the gate of FET 204 is pulled high by the auxiliary power output signal 136 through pull-up resistor 401.

As illustrated in FIG. 4, a processor 402 (such as a PIC12F519SN available from Microchip Technology, Inc. of Chandler, Ariz.) couples to the gate of FET 400. Additionally the gate of the FET 400 is coupled by way of a pull up resistor 404 to the auxiliary power output signal 136. Thus, the processor 402, executing a program, controls operation of the FET 400. Further, another output signal of the processor 402, in this illustrative case GP4, couples to the Super I/O 126, and similarly has a pull up resistor 406. The power switch 218 is coupled on one side to ground, and on the other side to an illustrative GP3 of the processor 402, which also has a pull up resistor 408. Finally, two inputs of the processor 402 are used in conjunction to couple to an Inter-Integrated Communication (I2C) bus port 162 of the ICH 122 (FIG. 1). As will be discussed more below, the I2C bus is used to communicate information from the BIOS to the processor 402 to set the desired powered-off state. The several conditions in which the signal line 206 is asserted (in the illustrative case of FIG. 4, asserted low) are addressed in turn.

Consider first a situation where the computer system 1000 is in a fully operational state, such as the S0 state, and that the computer system transitions to the S3 (standby or sleep) state. Powering of the RAM in the S3 state, and the various devices with which to wake the computer system, is by devices coupled to the auxiliary power rail 202. In the S0 state, the signal line 206 is held low by N-channel FET 400, and thus the auxiliary power rail 202 is powered. The computer system 1000 commands the power supply 130, such as over signal line 138 (FIG. 1), to deactivate the main power output signal 134. The processor 402, having received no message over the I2C bus, maintains an asserted state (here, a high voltage) on the gate of FET 400. Thus, FET 400 stays in a conductive state, signal line 206 remains low, and the auxiliary power rail 202 remains powered. Transitioning back to the S0 state requires no operational change by the processor 402.

Now consider a situation where the computer system transitions from an S0 fully operational state to an S5 soft-off state (I.a, an off-state where the computer system 1000 draws more than one watt of power). In the S5 state the computer system 1000 may wake based on LAN activity, and thus in the S5 state the auxiliary power rail 202 remains powered. In the S0 state, the signal line 206 is held low by N-channel FET 400, and thus the auxiliary power rail 202 is powered. The computer system 1000 commands the power supply 130, such as over signal line 138 (FIG. 1), to deactivate the main power output signal 134. The processor 402, having received no message over the I2C bus, maintains an asserted state on the gate of FET 400. Thus, FET 400 stays in a conductive state, signal line 206 remains low, and the auxiliary power rail 202 remains powered. Transitioning back to the S0 state requires no operational change by the processor 402.

Now consider a situation where the computer system transitions from an S0 fully operational state to the second powered-off state discussed above, where the computer system 1000 draws less than one watt of power. In this second powered-off state, in addition to the main power output signal 134 being deactivated within the power supply 130, the auxiliary power rail 202 of the motherboard 100 is decoupled from the auxiliary power signal 136. In the S0 state, the signal line 206 is held low by N-channel FET 400, and thus the auxiliary power rail 202 is powered. Just before, or contemporaneously with, the computer system 1000 commanding the power supply 130 to deactivate the main power output signal 134, the BIOS (by way of the I2C port 162 of FIG. 1) sends a message to the processor 402 over the I2C bus to enter the second powered-off state (as defined above). The processor 402, upon receiving the message, monitors a power rail in the system, such as the monitoring the power rail providing the 5V power to the USB ports (the monitoring over illustrative GP2). After sensing the power rail is off, in some cases the processor 402 waits a predetermined time (e.g., 500 microseconds) and then de-asserts (here, the signal goes low) the signal applied to gate of FET 400. The delay before de-asserting the gate signal to FET 400 may be to allow the various integrated circuits in the system to bleed off internally and/or externally stored charge. FET 400 stops conducting when the gate goes low, signal line 206 is pulled high by the auxiliary power output signal, and the auxiliary power rail 202 is decoupled from the auxiliary power output signal 136 by operation of FET 204. The processor 402 in the embodiments of FIG. 4 is powered by the auxiliary power output signal 136, and thus remains operational even in the second powered-off state. However, power draw for the illustrative processor may be on the order of 5 milli-Watts, and thus even considering the power draw by the processor 402 the computer system 1000 may still meet the one watt limitation.

Now consider the transition from the second powered-off state to a fully operational state. As indicated above, in the second powered-off state the features such as wake on keyboard, mouse, USB device or LAN are not available. Rather, transitioning the computer system 1000 from the second powered-off state involves actuation of the front panel power switch 218 (or the motherboard 100 mounted equivalent). In the embodiments of FIG. 4, actuation of the power switch 218 grounds illustrative input GP3 of the processor 402. Inasmuch as the processor 402 in these embodiments is powered by the auxiliary power output signal 136, the processor 402 periodically checks for assertion of the power switch 218 even in the second powered-off state. Once GP3 is asserted, the processor 402 asserts the signal to the gate of FET 400, thus powering the auxiliary power rail 202. Moreover, the processor 402 asserts (here, drives low) the signal on signal line 410 which is coupled to the Super I/O 126 by way of signal line 160 (FIG. 1). In some embodiments, the processor 402 asserts the signal line 410 for approximately 1.6 second, giving the Super I/O 126 time to power based on power draw from the auxiliary power rail 202, and to recognize assertion of the signal. The Super I/O, upon recognizing assertion of the signal line 410/160, commands the power supply 130 to activate the main power output signal 134, and the process of booting the computer continues.

The specification again turns to power loss situations in reference to the power control circuit 150 being implemented, at least in part, by a processor 402. In an unexpected power loss situation, the BIOS will not have the opportunity to send the message over the I2C bus regarding the desired powered-off state. In accordance with the various embodiments, the processor 402, as a default condition, drives the signal coupled to the gate of FET 400 in accordance with its last known state. Thus, if the computer system was in the second powered-off state when power was lost (no power on the auxiliary power rail 202), when power is restored the processor returns to the second powered-off state. On the other hand, if the auxiliary power rail 202 was powered just before power was lost, when power is restored the processor 402 returns to the condition where the auxiliary power rail 202 is powered (the first powered-off state). Whether the computer system 1000 remains in the first powered-off state in this situation is dependent upon the BIOS setting regarding whether to boot after power loss and restore. If set to boot, then upon power restore the Super I/O 126 will command the power supply 130 to activate the main power output signal 134, and the system boots. If the BIOS set to remain off after power restore, then the system remains in the first powered-off state (e.g., S5). The differences in operation as between the discrete and processor implementations are minimal, and set for convenience; however, in other embodiments the processor implementation may be designed and programmed to behave similar to the discrete implementation is so desired.

Figure 5:
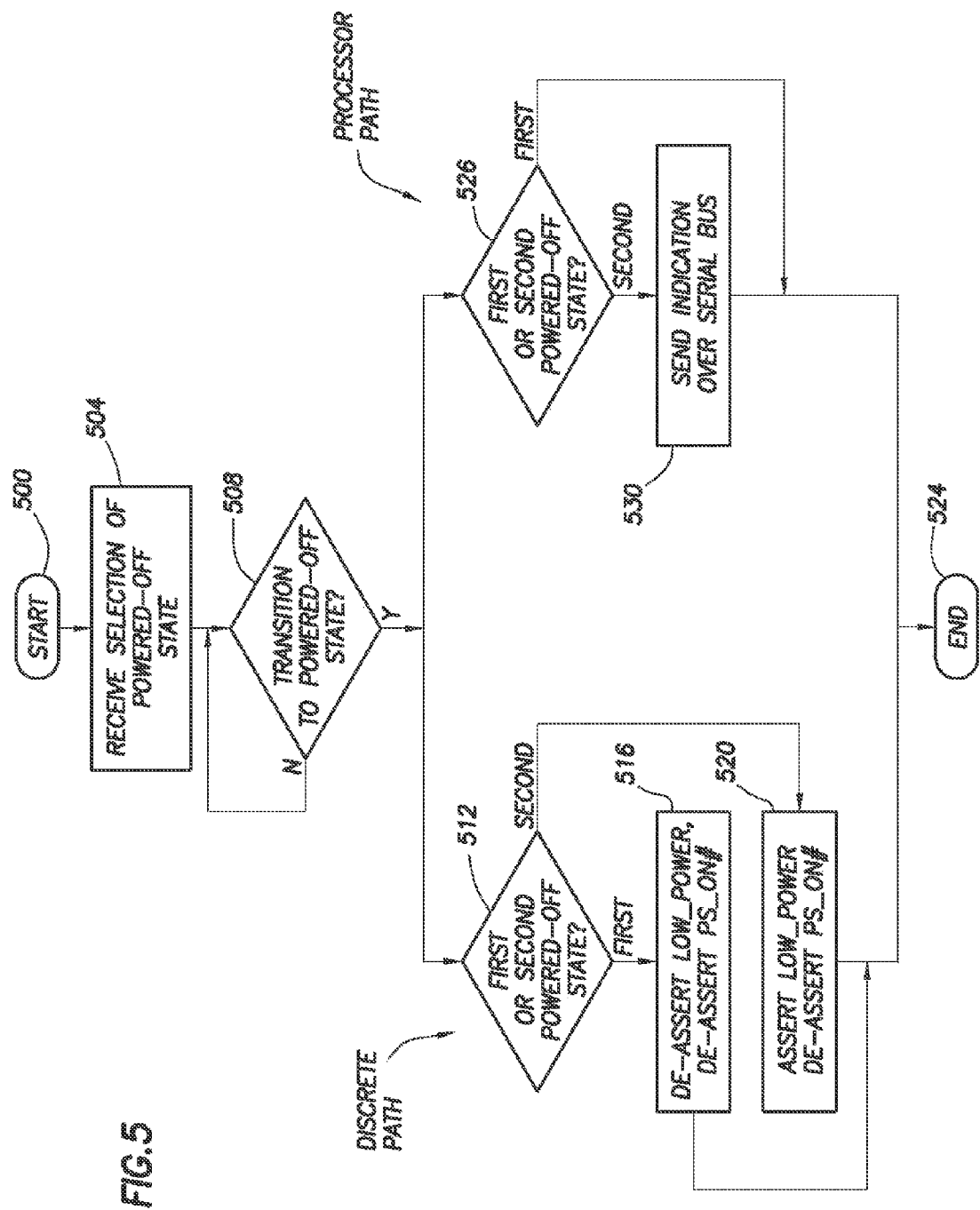
FIG. 5 shows a processor-implemented method in accordance with at least some embodiments.
Figure 6:
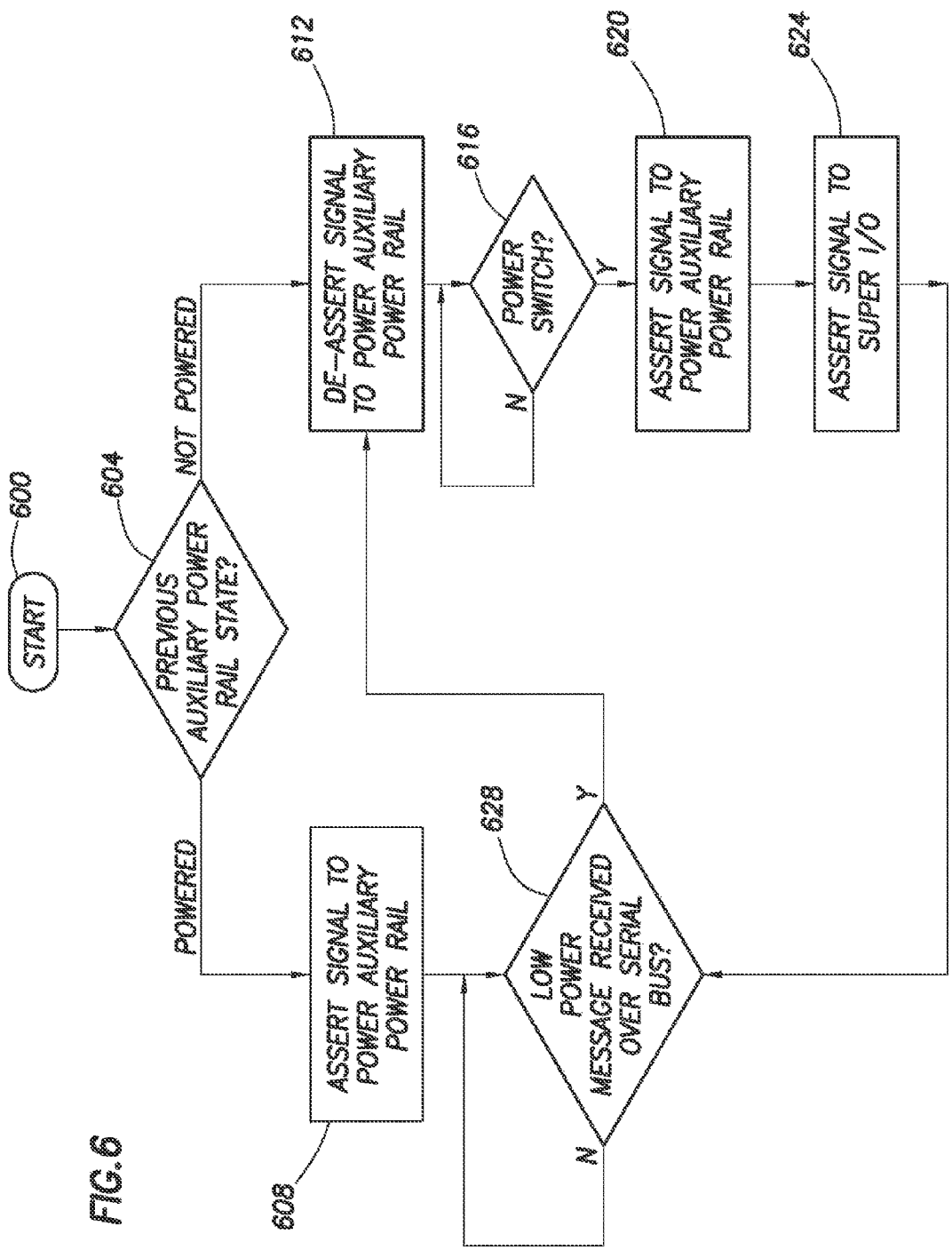
FIG. 6 shows a processor-Implemented method in accordance with at least some embodiments.

FIG. 5 illustrates a method associated with BIOS of the computer system 1000 in accordance with at least some embodiments. In particular, the method starts (block 500) and proceeds to receiving from a computer system user a selection of whether, when implementing powered-off states, to use the first powered-off state as described above, or the second powered-off state as described above (block 504). It is noted that receiving the selection of powered-off states need not be performed in every case. The user may enter the BIOS once, make the selection, and the BIOS may utilize the selection from that point forward. Moreover, the BIOS may have a default setting, and thus the user need not enter a selection at all. The method monitors for a command to transition to a powered-off state (block 508). When a command to transition is received, the method proceeds along one of two paths, depending on whether the motherboard implements the power control circuit 150 solely in discrete logic (FIG. 2) or by way of a processor (FIG. 4). In the case of the power control circuit 150 implemented in discrete logic, a determination is made as to whether the first (higher power) or second (low power) powered-off state (as described above) is indicated (block 512). If the first powered-off state is indicated, the method de-asserts the LOW_POWER signal, and de-asserts the PS_ON# signal (block 516). If, on the other hand, the second powered-off state is indicated (again block 512), the method asserts the LOW_POWER signal and de-asserts the PS_ON# signal (block 520). In some cases, the de-assertion of the PS_ON# signal is approximately 500 milli-seconds after assertion of the LOW_POWER signal. Thereafter, the method ends (block 524).

Still referring to FIG. 5, now consider the situation where the method is implemented in a computer system where the power control circuit 150 is implemented, at least in part, by a processor. Here again, a determination is made as to whether the first or second powered-off state (as described above) is indicated (block 526). If the second (low power) powered-off state is selected, then the BIOS sends and indication of the selected powered-off state over a serial bus (block 530), and the method ends (block 524). On the other hand, if the first powered-off state is selected (again block 526), then no message need be sent to the processor of the power control circuit 150, and thus the method transitions directly to end (block 524).

FIG. 600 illustrates a method which may be implemented on the processor 402 of the power control circuit 150. The method assumes a complete power loss by the processor 402 just prior to beginning the method. In particular, the method starts (block 600), and proceeds to a determination as to the last state of the auxiliary power rail (block 604). The state may be determined, for example, by inspection of internal or external non-volatile registers. If the last state of the auxiliary power rail was a powered condition, then the method proceeds to asserting the signal that controls powering of the auxiliary power rail (block 608). If, on the other hand, the last state of the auxiliary power rail was not powered (again block 604), the method proceeds to de-asserting the signal that controls powering of the auxiliary power rail (block 612) (i.e., the computer system remains in the second (low power) powered-off state). After de-asserting the signal (block 612), the illustrative method waits for actuation of the power switch (block 616). Once the power switch is actuated, the method proceeds to asserting the signal that controls powering of the auxiliary power rail (block 620), and asserting the signal to the Super I/O controller to command power-up of the computer system (block 624). In some cases, the signal to the Super I/O controller is asserted for a predetermined amount of time (e.g., 1.6 seconds). From either assertion of the signal that controls powering of the auxiliary power rail in block 608, or assertion of the signal to the Super I/O in block 624, the next step in the illustrative method is to wait for the receipt of a message over a serial bus that indicates the second (low power) powered-off state is desired (block 628). When received, the illustrative method retreats to de-asserting the signal that controls powering of the auxiliary power rail (block 612).

The above discussion is meant to be illustrative of the principles and various embodiments of the present invention. Numerous variations and modifications will become apparent to those skilled in the art once the above disclosure is fully appreciated. For example, a portion of the functionality of the power control circuit may be implemented in discrete logic, and another portion implemented by way of a processor. Further still, the functionality could be added to existing devices (e.g., the Super I/O 126, or a chipset component such as the ICH 122). It is intended that the following claims be interpreted to embrace all such variations and modifications.

What is claimed is:

1. A system comprising:
   a printed circuit board comprising a main processor;
   a power supply coupled to the printed circuit board, the power supply configured to produce a main power output signal and an auxiliary power output signal, and the main power output signal selectively activated within the power supply based on signals from devices on the printed circuit board; and
   a power control circuit comprising a processor different than the main processor;
   wherein the system is configured to have:
      a first powered-off state in which the main output power signal is deactivated within the power supply and the auxiliary power output signal is active and coupled to an auxiliary power rail of the printed circuit board; and
      a second powered-off state in which the main power output signal is deactivated and the auxiliary power output signal is active and decoupled from the auxiliary power rail of the printed circuit board; and
   wherein a device to wake the system from the first powered-off state is powered from the auxiliary power rail, and any device to wake the system from the second powered-off state is not powered from the auxiliary power rail but is coupled to the auxiliary power output signal; and
   wherein the processor is configured to receive an indication of which powered-off state to implement by a communication over a bus triggered by a basic input output system program.

2. The system of claim 1 wherein the printed circuit board further comprises a basic input output system (BIOS) memory, and wherein the BIOS memory stores a program that, when executed by the processor, causes the main processor to at least one selected from the group consisting of: utilize the first powered-off state to the exclusion of the second powered-off state; and utilize the second powered-off state to the exclusion of the first powered-off state.

3. The system of claim 1 wherein the power control circuit is configured to control coupling of the auxiliary power output signal to the auxiliary power rail.

4. The system of claim 3 wherein the power control circuit does not comprise a processor.

5. The system of claim 1 wherein the communication bus is at least one of a low pin count (LPC) bus and an Inter-Integrated Communication (I2C) bus.

6. The system of claim 1 wherein, in the second powered-off state, the printed circuit board draws 30 milli-Watts or less of power from the auxiliary power output signal.

7. The system of claim 6 wherein, in the second powered-off state, the printed circuit board draws 15 milli-Watts or less of power.

8. The system of claim 1 wherein, in the second powered-off state, the system draws one watt or less through a power cord coupled to a source of alternating current (AC) power.

9. A motherboard comprising:
   a printed circuit board;
   a main processor socket coupled to the printed circuit board;
   a connector coupled to the printed circuit board, the connector configured to couple to a switching power supply and receive through the connector main power signal and an auxiliary power signal;
   a power control circuit on the printed circuit board, the power control circuit configured to control powered-off states of the motherboard;
   wherein the power control circuit is configured to:
      place the motherboard in a first powered-off state in which the main power signal is deactivated within the switching power supply and the auxiliary power signal is active and coupled to an auxiliary power rail of the printed circuit board; and
      place the motherboard in a second powered-off state in which the main power signal is deactivated and the auxiliary power output signal is active and decoupled from the auxiliary power rail of the printed circuit board; and
   wherein a device to wake the system from the first powered-off state is powered from the auxiliary power rail, and any device to wake the system from the second powered-off state is not powered from the auxiliary power rail but is coupled to the auxiliary power output signal; and
   wherein the processor is configured to receive an indication of which powered-off state to implement by way of a communication bus.

10. The system of claim 9 wherein the power control circuit comprises a processor.

11. The system of claim 10 wherein the communication bus is at least one of a low pin count (LPC) bus and an Inter-Integrated Communication (I2C) bus.

12. The system of claim 9 wherein the power control circuit does not comprise a processor.

13. The system of claim 9 wherein, in the second powered-off state, the printed circuit board is configured to draw 30 milli-Watts or less of power from the auxiliary power output signal.

14. The system of claim 9 wherein, in the second powered-off state, the printed circuit board is configured to draw 15 milli-Watts or less of power from the auxiliary power output signal.

* * * * *